United States Patent [19]

Mochizuki et al.

[11] Patent Number: 4,768,540

[45] Date of Patent: Sep. 6, 1988

[54] FLOW CONTROL APPARATUS

[75] Inventors: Teruhiko Mochizuki; Atsushi Tanaka, both of Atsugi, Japan

[73] Assignee: Atsugi Motor Parts Company, Limited, Japan

[21] Appl. No.: 40,334

[22] Filed: Apr. 20, 1987

[51] Int. Cl.⁴ .......................... G05D 7/01; F16K 17/30
[52] U.S. Cl. ...................................... 137/117; 137/501; 137/503
[58] Field of Search ................ 137/110, 117, 501, 503

[56] References Cited

U.S. PATENT DOCUMENTS

| 2,214,250 | 9/1940 | Landrum | 251/117 X |
| 2,865,397 | 12/1958 | Cherault | 137/501 X |
| 4,361,166 | 11/1982 | Honaga et al. | 137/117 |
| 4,549,566 | 10/1985 | Fujiwara et al. | 137/117 |

Primary Examiner—Martin P. Schwadron
Assistant Examiner—Stephen M. Hepperle
Attorney, Agent, or Firm—Lane and Aitken

[57] ABSTRACT

A flow control valve comprising a housing formed with an intake passage, a drain passage and a discharge passage; a main spool and an auxiliary spool which are slideably housed within the housing; a first orifice disposed between the intake passage and the discharge passage; a second orifice disposed between the intake passage and the discharge passage and having an open area variable in response to displacement of the auxiliary spool; a drain orifice disposed between the first orifice and the drain passage and having an open area variable in response to displacement of the main spool; the main spool being movable in response to a first differential pressure; the auxiliary spool being movable in response to a second differential pressure; and a control ring secured within the housing and adapted to vary the open area of the first orifice in response to displacement of the auxiliary spool movable in response to the second differential pressure.

3 Claims, 3 Drawing Sheets

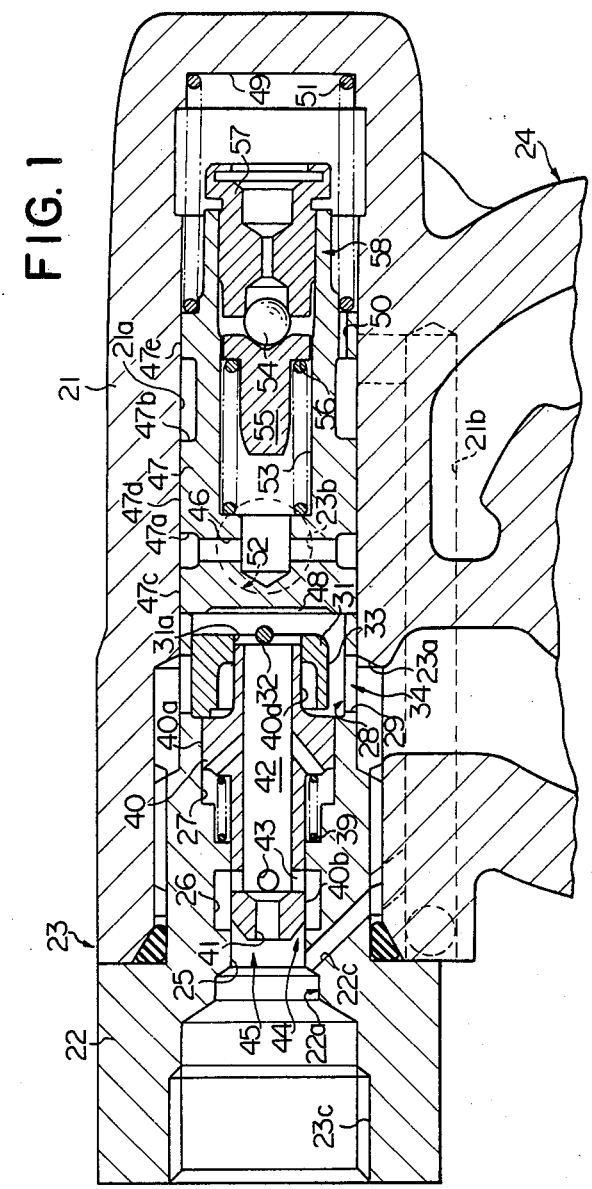
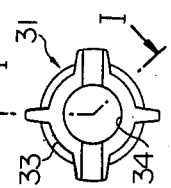
FIG. 1
FIG. 2

FLOW CONTROL APPARATUS

FIELD OF THE INVENTION

The present invention relates in general to a flow control apparatus and in particular to a flow control apparatus which is used in a power steering apparatus and the like of an automotive vehicle and regulates the flow rate of the working fluid supplied from a power source such as a pump to the power steering apparatus and the like.

SUMMARY OF THE INVENTION

In accordance with one important aspect of the present invention, there is provided a flow control valve comprising a housing formed with an intake passage, a drain passage and a discharge passage; a main spool and an auxiliary spool which are slideably housed within the housing; a first orifice disposed between the intake passage and the discharge passage; a second orifice disposed between the intake passage and the discharge passage and having an open area variable in response to displacement of the auxiliary spool; a drain orifice disposed between the first orifice and the drain passage and having an open area variable in response to displacement of the main spool; the main spool being movable in response to a differential pressure between upstream and downstream sides of the second orifice; the auxiliary spool being movable between upstream and downstream sides of said second orifice in response to differential pressures between upstream and downstream sides of the first orifice between upstream and downstream sides of the second orifice; and a control ring secured within the housing and adapted to vary the open area of the first orifice in response to displacement of the auxiliary spool so that pressure in the upstream side of the first orifice is extremely slowly increased, the control ring being formed at the outer surface thereof with grooves and at the inner surface thereof with an axial bore with which the auxiliary spool is engageable.

DESCRIPTION OF THE PRIOR ART

An oil pump, which is employed as a power source to supply a working fluid to the power steering apparatus of an automotive vehicle which uses fluid as a working medium to assist in a steering torque, is generally driven to rotate by an internal-combustion engine mounted in the vehicle. As the number of rotations of the oil pump increases, the discharge flow rate correspondingly increases.

However, the flow rate necessary for a power steering operation is required to be assured at the relatively lower speed region of the engine and not much needed at the higher speed region. Consequently, the excess amount of flow rate resulting from the high speed rotation is generally bypassed by a flow control apparatus and returned back to a reservoir tank and the like.

The inventors of this application have proposed a flow control apparatus shown in FIG. 3 as the above type apparatus. An intake passage 2 leads from a pump 1 to a main orifice 3. The main orifice 3 is held in fluid communication with a power steering apparatus 5 through an auxiliary orifice 4 of the variable type. The flow rate passing through the auxiliary orifice 4 is regulated by movement of an auxiliary spool 8 which is axially movable in response to a differential pressure which is caused between the upstream and downstream sides of the main orifice 3 through an orifice 6 and through a passage 7. A main spool 9 is axially movable in response to a differential pressure, which is caused between the front and rear ends of the auxiliary orifice 4.

A characteristic of the discharge flow rate of the flow control apparatus of the above type is shown in FIG. 4(b). While the working oil discharged from the pump 1 passes through the main and auxiliary orifices 3 and 4, the working oil flowing in the auxiliary orifice 4 is increased, so that the differential pressure between the upstream and downstream sides of the auxiliary orifice 4 is correspondingly increased and causes the main spool 9 to move rightward against a spring 11. Consequently, the drain passage 10 is opened by the rightward movement of the main spool 9, and a part of the working oil is returned back to the reservoir tank through the drain passage 10. After a short time, the working oil supplied to the power steering apparatus is maintained a flow rate $Q_2$ under the control of the main and auxiliary orifices 3 and 4. As the discharge flow rate of the pump 1 is further increased, the main spool 9 is further moved rightward, and at the same time the auxiliary spool 8 is moved leftward against a spring 12 by an increase in the differential pressure between the upstream and downstream sides of the main orifice 3. The leftward movement of the auxiliary spool 8 throttles the auxiliary orifice 4, so that the flow rate supplied to the power steering apparatus 5 is reduced from the flow rate $Q_2$ to a flow rate $Q_1$. That is, the flow rate supplied to the power steering apparatus 5 is regulated by a so-called flow-down control.

However, in the aforementioned conventional flow control apparatus, since the working oil from the pump 1 is returned to the drain passage 10 through the fixed throttle type main orifice 3, the pressure within the intake passage 2 increases due to the resistance caused by the main orifice 3 and therefore the pump 1 is forced to be operated uselessly. As a result, the conventional flow control apparatus has the disadvantages that the loss of energy occurs due to the increase in the pump load and the degradation of the working oil is accelerated by the rise in the temperature of the working oil caused by the heat generation resulting from the increase in the pump load. Furthermore, if the temperature of the working oil rises, since a large number of parts of rubber material are used in the pump 1 and power steering apparatus 5, the degradation of the rubber parts is accelerated and cavitation tends to occur, thereby resulting in damage of the pump 1 and power steering apparatus 5.

It is, accordingly, an object of the present invention to provide an improved flow control apparatus which eliminates and prevents the aforementioned drawbacks in the prior art. The object of the present invention is achieved by a flow control valve comprising a housing formed with an intake passage, a drain passage and a discharge passage; a main spool and an auxiliary spool which are slideably housed within the housing; a first orifice disposed between the intake passage and the discharge passage; a second orifice disposed between the intake passage and the discharge passage and having an open area variable in response to displacement of the auxiliary spool; a drain orifice disposed between the first orifice and the drain passage and having an open area variable in response to displacement of the main spool; the main spool being movable in response to a differential pressure between upstream and downstream sides of the second orifice; the auxiliary spool being movable in response to a differential pressure between upstream and downstream sides of the first orifice or between an upstream side of the first orifice and a downstream side of the second orifice; and a control ring secured within the housing and adapted to vary the open area of the first orifice in response to displacement of the auxiliary spool movable in response to a differential pressure between upstream and downstream sides of the first orifice. According to the flow control valve of the present invention, since the open area of the second orifice increases between the intake passage and the discharge passage in the low flow rate region of the fluid flowing in the intake passage and also the open area of the first orifice increases by the operation of the control ring and auxiliary spool in the high flow rate region, the resistance as a whole is reduced and the pump is not forced to be operated uselessly. That is, since the load of the pump is reduced, the loss of energy and the heat generation do not occur. Furthermore, since the temperature of the working fluid does not rise, the degradation of the rubber parts and fluid can be prevented and also the occurrence of cavitation can be prevented.

BRIEF DESCRIPTION OF THE DRAWINGS

The drawbacks of a conventional flow control valve and the features and advantages of a flow control valve according to the present invention will be more clearly understood from the following description taken in conjunction with the accompanying drawings in which:

FIG. 1 is a cross sectional view showing one embodiment of the flow control valve constructed in accordance with the present invention and showning a control ring taken substantially along line I—I indicated in FIG. 2, FIG. 2 is an end view of the control ring shown in FIG. 1;

DESCRIPTION OF THE PREFERRED EMBODIMENT

Figure 3:
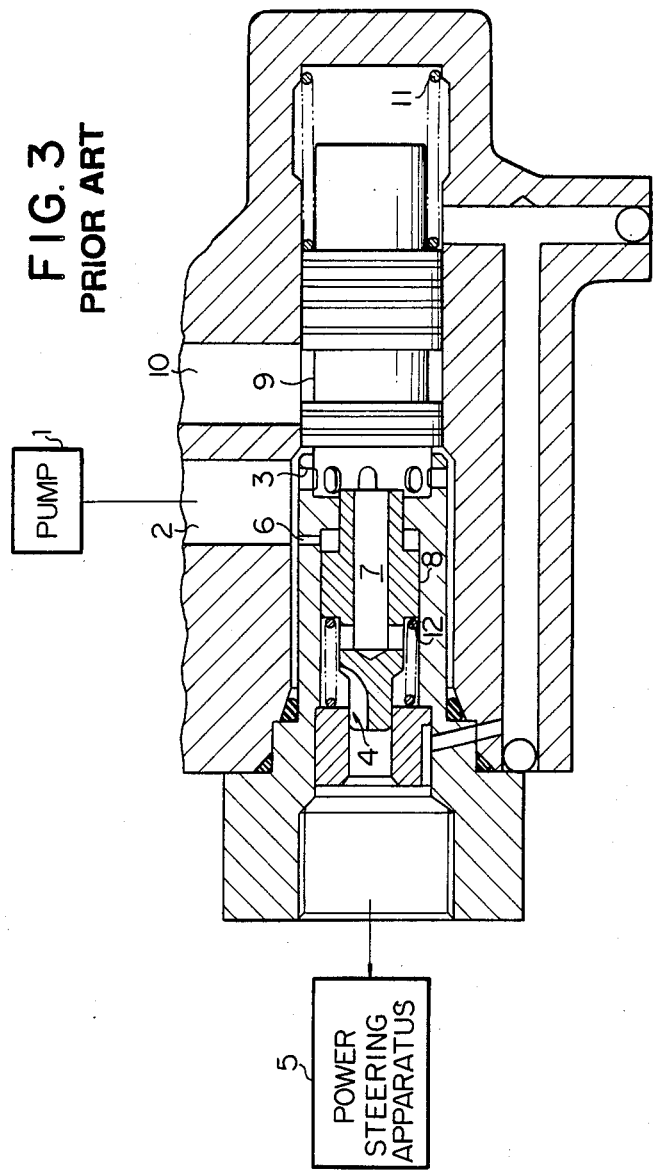
FIG. 3 is a cross sectional view showing the conventional flow control valve.

Referring to FIGS. 1 and 2, there is shown one embodiment of the present invention which is used in a power steering apparatus of an automotive vehicle. In FIG. 1, reference numeral 21 designates a casing formed with an axially extending bore 21a opening at the left end in FIG. 1 and 22 designates a hollow connector with a bore 22a. The connector 22 is threaded into the open end of the axially extending bore 21a of the casing 21 and serves as a valve housing 23 in cooperation with the casing 21. In the casing 21 is formed intake passage 23a and drain passage 23b which are open to the axially extending bore 21a. The intake passage 23a is communicated with a discharge port of a pump 24, and the drain passage 23b is communicated with an intake port of the pump 24. The pump 24 is driven by an engine (not shown) mounted in an automotive vehicle and pressurizes fluid within a reservoir (not shown) and discharges the same at a constant flow rate per one revolution of the rotational shaft. The bore 22a of the connector 22 is provided at the left end thereof with a discharge passage 23c which is connected with a control valve (four-position change-over valve) of the power steering apparatus (not shown). Also, the bore 22a of the connector 22 has at the opposite side of the discharge passage 23c a small diameter portion 25 and first, second and third large diameter portions 26, 27 and 28. In the third large diameter portion 28 is formed a connecting passage 29 which communicates the bore 22a of the connector 22 with the intake passage 23a communicated with the discharge port of the pump 24. Reference numeral 31 designates a hollow control ring which is received in the third large diameter portion 28 and secured to the large diameter portion 28 by a pin 32 mounted in the connector 22. The control ring 31 is formed at the outer surface thereof with axial grooves 33 (FIG. 3) communicating the connecting bore 29 with the axial extending bore 21a, and at the inner surface thereof with an axial bore 31a. Reference numeral 40 designates a tubular auxiliary spool which is axially slideably received in the bore 22a of the connector 22 and the axial bore 31a of the control ring 31. The auxiliary spool 40 has at the outer surface thereof a first small diameter portion 40b slideably received in the land portion between the first and second diameter portions 26 and 27 of the connector 22, a large diameter portion 40a slideably received in the second diameter portion 27 of the connector 22 and a second small diameter portion 40d slideably received in the axial bore 31a of the control ring 31, and further has an axial bore 42 at the inner surface thereof. The grooves 33 of the control ring 31, and the interstice between the outer surface of the second small diameter portion 40d of the auxiliary spool 40 and the inner surface of the axial bore 31a of the control ring 31, in combination with each other, constitute a first orifice 34. The first orifice 34 is located between the intake passage 23a and the discharge passage 23c and varies the open area thereof in response to the displacement of the auxiliary spool 40. That is, when the small diameter portion 40d of the auxiliary spool 40 is positioned within the axial bore 31a of the control ring 31, the open area of the first orifice 34 is determined by the connecting bore 29 and the grooves 33 of the control ring 31. When, on the other hand, the small diameter portion 40d of the auxiliary spool 40 is disengaged from the axial bore 31a of the control ring 31, the open area of the first orifice 34 is determined by the interstice between the outer surface of the small diameter portion 40d and the inner surface of the axial bore 31a and by the connecting bore 29 and the grooves 33. A coil spring 39 is interposed between one end face of the second large diameter portion 27 and the large diameter portion 40a of the auxiliary spool 40 to urge the auxiliary spool 40 toward the control ring 31. Adjacent one end portion (left end in FIG. 1) of the axial bore 42 of the auxiliary spool 40 is provided a main orifice 41, and adjacent the main orifice 41 is provided a bore 43 which is arranged perpendicularly of the axial bore 42 and which is open to the first large diameter portion 26 of the bore 22a of the connector 22. As a result, the upstream side and downstream side of the main orifice 41 are communicated with each other through the bore 43 and through an interstice between the first large diameter portion 26 of the bore 22a of the connector 22 and the outer surface of the first small diameter portion 41b of the auxiliary spool 40. The outer surface of the first small diameter portion 41b (opposing to the discharge passage 23c) of the auxiliary spool 40 constitutes an auxiliary orifice 44 in cooperation with the shoulder portion between the small diameter portion 25 of the bore 22a and the first large diameter portion 26 of the bore 22a. The auxiliary orifice 44 is closed by the leftward movement of the auxiliary spool 40 and varies the open area thereof. That is, the open area of the auxiliary orifice 44 depends upon the position of the auxiliary spool 40 relative to the connector 22. The auxiliary orifice 44 and the main orifice 41 are disposed in parallel relationship between the axial bore 42 and the discharge passage 23c and constitute a second orifice 45. The open area of the second orifice 45 is changed in response to the change in the open area of the auxiliary orifice 44. The aforementioned pin 32 also serves as a stopper to limit the rightward movement of the auxiliary spool 40.

A main spool 47 is slideably received in the rightward portion of the axially extending bore 21a of the casing 21 and defines a first pressure chamber 48 at one end thereof and a second pressure chamber 49 at the other end thereof. The first pressure chamber 48 is communicated with the intake passage 23a through the connecting bore 29 and the grooves 33 of the control ring 31 and through the interstice between the axial bore 31a of the control ring 31 and the outer surface of the second small diameter portion 41d of the auxiliary spool 40, and also communicated with the discharge passage 23c through the second orifice 45. That is, the first pressure chamber 48 is disposed upstream of the second orifice 45 and communicates the second orifice 45 with the intake passage 23a through the first orifice 34. On the other hand, the second pressure chamber 49 is communicated with the bore 22a disposed downstream of the second orifice 45 through a narrow bore 50 formed in a land portion (to be described hereinafter) of the main spool 47, a bore 21b formed in the casing 21 and through an oblique bore 22c formed in the connector 22. A coil spring 51 is provided within the second pressure chamber 49 to urge the main spool 47 leftward. The main spool 47 is formed at the outer surface thereof with a first land portion 47c, a second land portion 47d and a third land portion 47e. The main spool 47 is further formed with a first circumferential groove 47a between the first and second land portions 47c and 47d and a second circumferential groove 47b between the second and third land portions 47d and 47e. The first circumferential groove 47a is open to the drain passage 23b, and the second circumferential groove 47b is open to the bore 21b of the casing 21. The first land portion 47c of the main spool 47 constitutes a drain orifice 52 in cooperation with the open end of the drain passage 23b. This drain orifice 52 is located between the first pressure chamber 48 and the drain passage 23b and varies the open area thereof in response to the axial movement of the main spool 47. That is, as the main spool 47 is moved rightward, the drain orifice 52 increases the open area of the drain passage 23b and communicates the intake passage 23a with the drain passage 23b through the first pressure chamber 48 with the open area corresponding to the displacement of the main spool 47. The third land portion 47e of the main spool 47 is formed with the aforementioned narrow groove 50 which communicates the second groove 47b between the second and third land portions 47d and 47e with the second pressure chamber 49. This narrow groove 50 communicates the second pressure chamber 49 with the bore 22a arranged downstream of the second orifice 45 through the second groove 47b of the main spool 47, the bore 21b of the casing 21 and the oblique bore 22c of the connector 22. The main spool 47 is further formed with an axial bore 53 which is communicated at its one end with the first groove 47a in the outer surface of the main spool 47 through a radial bore 46. Within the axial bore 53 of the main spool 47 is provided a relief valve 58 which comprises a ball 54. The ball 54 is seated on an end stop 57 through a pressure rod 55 by a check spring 56. The end stop closes the other open end of the axial bore 53 and is secured to the main spool 47. The relief valve 58 is adapted to relieve an excess of pressure in the discharge passage 23c, which is introduced within the second pressure chamber 49 through the oblique bore 22c, bore 21b, second groove 47b and through narrow groove 50, by returning the fluid within the second pressure chamber 49 back to the drain passage 23b through the relief valve 58.

The operation of the embodiment of the present invention thus constructed and arranged will hereinafter be described in detail.

In the flow control apparatus according to the present invention, the main spool 47 is displaced so that the differential pressure between the upstream and downstream sides of the second orifice 45 (differential pressure between the first and second pressure chambers 48 and 49) is maintained constant, and the open area of the drain orifice 52, that is, the open area of the drain passage 23b is varied so that a part of fluid flowing in the intake passage 23a is discharged from the drain passage 23b. Furthermore since the high pressure on the upstream side of the first orifice 34 acts on one end face of the land portion 40a of the auxiliary spool 40 and the low pressure on the downstream side of the first orifice 34 acts on the other end face of the land portion 40a through an oblique passage formed in the land portion 40a, the auxiliary spool 40 is displaced in response to the differential pressure between the upstream and downstream sides of the first orifice 34. In this way, the flow rate supplied from the discharge passage 23c to the power steering apparatus is maintained along a characteristic of flow rate shown in FIG. 4(b). That is, in the present invention, since the discharge flow rate of the pump 24 driven by the engine mounted in the vehicle is substantially proportional to the number of rotations of the engine, a part of the fluid flowing from the intake passage 23a is returned back to the pump 24 through the drain passage 23b, and thus the fluid supplied to the power steering apparatus from the discharge passage 23c is maintained along the characteristic of flow rate shown in FIG. 4(b).

Figure 4:
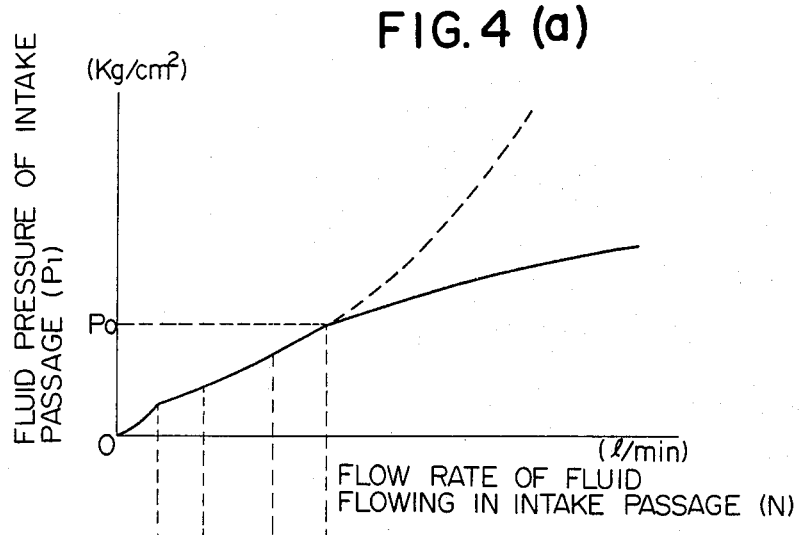
FIG. 4(a) shows the relationship between the fluid pressure and flow rate of the fluid flowing in an intake passage shown in FIG. 1.
FIG. 4(b) shows a characteristic of flow rate.
Figure 4:
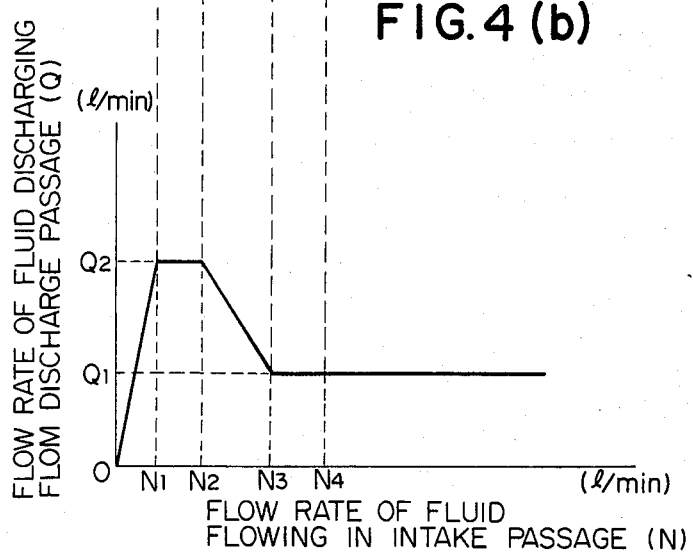

In FIGS. 4(a) and 4(b), the fluid pressure from the intake passage 23a to the first orifice 34, the fluid pressure from the first orifice 34 to the second orifice 45 and the fluid pressure from the second orifice 45 to the discharge passage 23c are indicated by $P_1$, $P_2$ and $P_3$, respectively.

In the case that the flow rate of the fluid flowing in the intake passage 23a (N) is less than a predetermined value $N_1$, the main spool 47 is located leftward of FIG. 1 by the spring 51. The auxiliary spool 40 is also located rightward of FIG. 1 by the spring 39, and the small diameter portion 40d is located within the axial bore 31a of the control ring 31. For this reason, the first orifice 34 has the open area which is determined by the grooves 33 of the control ring 31, and the second orifice 45 has the open area which is determined by the toral area of the open area of the main orifice 41 and the open area of the auxiliary orifice 44, and the drain orifice 52 is closed because the drain passage 23b is closed by the first land portion 47c of the main spool 47. Consequently, the fluid in the intake passage 23a flows into the axial bore 42 of the auxiliary spool 40 through the first orifice 34 and the first pressure chamber 48, and further passes through the main orifice 41 and the auxiliary orifice 44 and the entire amount of the fluid is supplied from the discharge passage 23c to the power steering apparatus.

In the case that the flow rate of the fluid flowing in the intake passage 23a (N) is more than the flow rate $N_1$ and less than a flow rate $N_2$, the differential pressure ($dP_2$) between the upstream and downstream sides of the second orifice 45 ($dP_2 = P_2 - P_3$) increases, so that the main spool 47 is caused to move in response to the differential pressure $dP_2$ (that is, the differential pressure between the first and second pressure chambers 48 and 49) and opens the drain passage 23b. That is, the main spool 47 moves rightward against the spring 51 so that the differential pressure $dP_2$ between the upstream and downstream sides of the second orifice 45 is maintained constant, and opens the drain passage 23b. For this reason, the fluid in the intake passage 23a is partly discharged from drain passage 23b through the first orifice 34 and first pressure chamber 48, so that the flow rate Q supplied from the discharge passage 23c to the power steering apparatus becomes a flow rate $Q_2$. In this instance, since the discharge passage 23c is communicated with the intake passage 23a through the first orifice 34, main orifice 41 and auxiliary orifice 44 arranged in parallel to the main orifice 41, the flow rate is capable of being controlled to a relatively larger value $Q_2$. That is, the reason is that since the auxiliary orifice 44 arranged in parallel to the main orifice 41 is provided between the axial bore 42 and the discharge passage 23c, the second orifice 45 has a relatively larger open area.

In the case that the flow rate of the fluid flowing in the intake passage 23a (N) is more than the value of $N_2$ and less than a value of $N_3$, the differential pressure $dP_1$ ($dP_1 = P_1 - P_2$) between the upstream and downstream sides of the first orifice 34 is increased and also the differential pressure $dP_2$ between the upstream and downstream sides of the second orifice 45 is increased. For this reason, since the auxiliary spool 40 is caused to move leftward against the spring 39 and closes the auxiliary orifice 44, the open area of the auxiliary orifice 44 is decreased by an amount corresponding to the displacement of the auxiliary spool 40. As a result, the flow rate Q supplied from the discharge passage 23c to the power steering apparatus is decreased. This decrease in the flow rate Q reduces an assist force of steering which is produced by the power steering apparatus, and thus a suitable steering operation at the high speed of the vehicle is assured.

In the case that the flow rate of the fluid flowing in the intake passage 23a (N) is more than the value of $N_3$ and less than a value of $N_4$, the auxiliary spool 40 is further displaced leftward and finally the auxiliary orifice 44 is completely closed. Consequently, the intake passage 23a and the discharge passage 23c are communicated with each other only through the first orifice 34 and main orifice 41, and the main spool 47 is displaced so that the differential pressure $dP_2$ between the upstream and downstream sides of the main orifice 41 is maintained constant. For this reason, as shown in FIG. 4(b), the flow rate Q supplied from the discharge passage 23c to the power steering apparatus becomes a flow rate $Q_1$. In this instance, since the small diameter portion 40d of the auxiliary spool 40 is still located within the axial bore 31a of the control ring 31, the first orifice 34 does not vary in open area.

In the case that the flow rate of the fluid flowing in the intake passage 23a (N) is more than the value of $N_4$, the auxiliary spool 40 is still further displaced leftward, and the small diameter portion 40d is disengaged from the axial bore 31a of the control ring 31, so that the open area of the first orifice 34 increases. That is, after the small diameter portion 40d is disengaged from the axial bore 31a of the control ring 31, an annular interstice is formed between the end portion of the outer surface of the small diameter portion 40d and the axial bore 31a. For this reason, the first orifice has an open area which is determined by the grooves 33 of the control ring 31 and aforementioned annular interstice, and the open area increases in proportion to the leftward movement of the auxiliary spool 40 which is caused by the increase in the flow rate Q of the fluid flowing in the intake passage 23a. Consequently, the rising rate of the fluid pressure $P_1$ of the intake passage 23a, as shown in FIG. 4(a), becomes extremely slow, thereby alleviating the load of pump 24 and preventing the rise in the fluid temperature caused by the rise in the fluid pressure $P_1$.

On the other hand, for instance, in the case that the flow rate $Q_1$ of the fluid supplied from the discharge passage 23c to the power steering apparatus is held a predetermined value (generally, in the case that the flow rate N of the fluid flowing in the intake passage 23a at the high speed of the vehicle is more than the value $N_3$), when the power steering apparatus is operated, the auxiliary spool 40 is subjected to a pressure in the rightward direction because the fluid pressure $P_3$ in the discharge passage 23c increases (the increase in the pressure $P_3$ is referred to as dP). However, in the present invention, the differential pressure between the upstream and downstream sides of the second orifice 45 is held constant to maintain the discharge flow rate $Q_1$ constant. That is, the increase dP in the discharge pressure acts on the second pressure chamber 49 through the bore 21b, second groove 47b and narrow groove 50, so that the main spool 47 is caused to move leftward to narrow the open area of the drain orifice 52 and to raise the pressure in the first pressure chamber 48 by an amount of dP. For this reason, the pressures of the front and rear ends of auxiliary spool 40 are increased by the amount of dP, respectively, and therefore, since the auxiliary orifice 44 is not opened, the characteristic of flow rate shown in FIG. 4(b) is invariably maintained.

It should be noted that in the case that the fluid pressure $P_3$ became abnormally high, the excess of the pressure can be relieved and returned back to the drain passage 23b by means of the relief valve 58.

From the foregoing description, it will be seen that according to the flow control valve of the present invention, since the open area of the second orifice increases between the intake passage and the discharge passage in the low flow rate region of the fluid flowing in the intake passage and also the open area of the first orifice increases by the operation of the control ring and auxiliary spool in the high flow rate region, the resistance as a whole is reduced and the pump is not forced to be operated uselessly. That is, since the load of the pump is reduced, the loss of energy and the heat generation do not occur. Furthermore, since the temperature of the working fluid does not rise, the degradation of the rubber parts and fluid can be prevented and also the occurrence of cavitation can be prevented.

While a certain representative embodiment and details have been shown for the purpose of illustrating the invention, it will be apparent to those skilled in this art that various changes and modifications may be made therein without departing from the spirit or scope of the invention.

What we claim is:

1. A flow control valve comprising
   a housing formed with an intake passage, a drain passage and a discharge passage;
   a main spool and an auxiliary spool which are slideably housed within said housing;
   a first orifice disposed between said intake passage and said discharge passage;
   a second orifice disposed between said intake passage and said discharge passage and having an open area variable in response to displacement of said auxiliary spool;
   a drain orifice disposed between said first orifice and said drain passage and having an open area variable in response to displacement of said main spool;
   said main spool being movable in response to a differential pressure between upstream and downstream sides of said second orifice;
   said auxiliary spool having surfaces subject to pressure upstream of said first orifice, pressure between said first and second orifices and pressure downstream of said second orifice, and being movable to partially close and open said second orifice in response to differential pressures between upstream and downstream sides of said first orifice and between upstream and downstream sides of said second orifice; and
   a control ring secured within said housing and adapted to vary said open area of said first orifice in response to displacement of said auxiliary spool so that pressure on said upstream side of said first orifice is extremely slowly increased, the control ring having an outer surface defining grooves extending from the upstream side of said first orifice to the downstream side of said first orifice and an inner surface defining an axial bore with which said auxiliary spool is engageable.

2. A flow control valve as set forth in claim 1, in which said first orifice comprises said grooves of said control ring and an interstice between a portion of said auxiliary spool and said axial bore of said control ring.

3. A flow control valve as set forth in claim 2, wherein said auxiliary spool is movable among positions in which said spool engages said axial bore and positions in which said spool is spaced from said axial bore to define said interstice.

* * * * *